(12) United States Patent
Richards et al.

(10) Patent No.: US 7,962,662 B2
(45) Date of Patent: Jun. 14, 2011

(54) CONFIGURING MULTI-BIT SLAVE ADDRESSING ON A SERIAL BUS USING A SINGLE EXTERNAL CONNECTION

(75) Inventors: Patrick K. Richards, Peoria, AZ (US); Vincent Quiquempoix, Divonne les Bains (FR); Gabriele Bellini, Froideville (CH)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 12/894,296

(22) Filed: Sep. 30, 2010

(65) Prior Publication Data

US 2011/0022878 A1 Jan. 27, 2011

Related U.S. Application Data

(62) Division of application No. 12/098,725, filed on Apr. 7, 2008, now Pat. No. 7,827,330.

(60) Provisional application No. 60/952,401, filed on Jul. 27, 2007.

(51) Int. Cl.
*G06F 3/00* (2006.01)
*G06F 13/12* (2006.01)

(52) U.S. Cl. ............... 710/9; 710/16; 710/62; 710/69

(58) Field of Classification Search ............... None
See application file for complete search history.

(56) References Cited

U.S. PATENT DOCUMENTS

| 2003/0137267 A1 | 7/2003 | Blake ............... 318/471 |
| 2005/0057980 A1 | 3/2005 | Ahne ............... 365/200 |
| 2005/0127402 A1 | 6/2005 | Dybsetter et al. ....... 257/200 |

FOREIGN PATENT DOCUMENTS

EP 1355426 10/2003

OTHER PUBLICATIONS

European Office Action for Application No. 08 782 367.0 (8 pages), May 19, 2010.
International Search Report and Written Opinion for Application No. PCT/US2008/071130 (18 pages), Oct. 15, 2008.
XP-002498155: BL310 "I2C Versatile Relay Driver" Broadcast Equipment Ltd., retrieved from: http://web.archive.org/web/20040102194445/http://i2cchip.com/bl310 (7 pages), Jan. 2, 2004.

(Continued)

*Primary Examiner* — Alan Chen
(74) *Attorney, Agent, or Firm* — King & Spalding L.L.P.

(57) ABSTRACT

Unique addresses for a plurality of devices may be programmed through a single external connection (pin) on each device by using a one of a plurality of different analog voltage or current values on the single external pin in combination with a serial clock of a serial data bus for each device requiring a unique binary address. The unique binary address is stored in the device after detection of certain number of clocks on the serial data bus. Once the unique binary address has been stored in the device, the single external connection may be used for another purpose such as a multifunction external connection. This unique binary address may be retained by the device until a power-on-reset (POR) or general reset condition occurs. Address detection and address load commands on the serial bus may also perform the same address definition and storage functions.

17 Claims, 4 Drawing Sheets

OTHER PUBLICATIONS

XP-002498156: LM73 "2.7V,SOT-23, 11-to-14 Bit Digital Temperature Sensor with 2-Wire Interface" National Semiconductor Corporation, retrieved from: http://www.national.com/ds.cgi/LM/LM73.pdf (18 pages), Jul. 12, 2006.

XP-002498157: TLV320A1C33: "Low Power Stereo Audio Codec for Portable Audio/Telephony" Texas Instruments Incorporated; Retrieved from: http://focus.ti.com/lit./ds/symlink/tiv320aic33.pdf (49 pages), Jul. 1, 2006.

Decision to Refuse European Application No. 08 782 367.0 (15 pages), Feb. 11, 2011.

Vdd = 5.0V

| Vin | Address Voltage Ranges | | Flash DAC Outputs | A2 | A1 | A0 |
|---|---|---|---|---|---|---|
| 4.375 | 5.000 | 4.594 | 1111111 | 1 | 1 | 1 |
| 3.750 | 4.156 | 3.938 | 0111111 | 1 | 1 | 0 |
| 3.125 | 3.563 | 3.281 | 0011111 | 1 | 0 | 1 |
| 2.500 | 2.969 | 2.625 | 0001111 | 1 | 0 | 0 |
| 1.875 | 2.375 | 1.969 | 0000111 | 0 | 1 | 1 |
| 1.250 | 1.781 | 1.313 | 0000011 | 0 | 1 | 0 |
| 0.625 | 1.188 | 0.656 | 0000001 | 0 | 0 | 1 |
| --- | 0.594 | 0.000 | 0000000 | 0 | 0 | 0 |

Vdd = 3.3V

| Vin | Address Voltage Ranges | | Flash DAC Outputs | A2 | A1 | A0 |
|---|---|---|---|---|---|---|
| 2.888 | 3.300 | 3.032 | 1111111 | 1 | 1 | 1 |
| 2.475 | 2.743 | 2.599 | 0111111 | 1 | 1 | 0 |
| 2.063 | 2.351 | 2.166 | 0011111 | 1 | 0 | 1 |
| 1.650 | 1.959 | 1.733 | 0001111 | 1 | 0 | 0 |
| 1.238 | 1.568 | 1.299 | 0000111 | 0 | 1 | 1 |
| 0.825 | 1.176 | 0.866 | 0000011 | 0 | 1 | 0 |
| 0.412 | 0.784 | 0.433 | 0000001 | 0 | 0 | 1 |
| --- | 0.392 | 0.000 | 0000000 | 0 | 0 | 0 |

Vdd = 1.8V

| Vin | Address Voltage Ranges | | Flash DAC Outputs | A2 | A1 | A0 |
|---|---|---|---|---|---|---|
| 1.575 | 1.800 | 1.654 | 1111111 | 1 | 1 | 1 |
| 1.350 | 1.496 | 1.418 | 0111111 | 1 | 1 | 0 |
| 1.125 | 1.283 | 1.181 | 0011111 | 1 | 0 | 1 |
| 0.900 | 1.069 | 0.945 | 0001111 | 1 | 0 | 0 |
| 0.675 | 0.855 | 0.709 | 0000111 | 0 | 1 | 1 |
| 0.450 | 0.641 | 0.473 | 0000011 | 0 | 1 | 0 |
| 0.225 | 0.428 | 0.236 | 0000001 | 0 | 0 | 1 |
| --- | 0.214 | 0.000 | 0000000 | 0 | 0 | 0 |

FIGURE 4

CONFIGURING MULTI-BIT SLAVE ADDRESSING ON A SERIAL BUS USING A SINGLE EXTERNAL CONNECTION

RELATED PATENT APPLICATION

This is a divisional application of and claims priority to commonly owned U.S. patent application Ser. No. 12/098,725; filed Apr. 7, 2008 now U.S. Pat. No. 7,827,330, which claims priority to U.S. Provisional Patent Application Ser. No. 60/952,401; filed Jul. 27, 2007; both entitled "Configuring Multi-Bit Slave Addressing On A Serial Bus Using A Single Pin," by Patrick K. Richards, Vincent Quiquempoix and Gabriele Bellini; and which are hereby incorporated by reference herein for all purposes.

TECHNICAL FIELD

The present disclosure relates to digital devices, and more particularly, to configuring multi-bit addressing for a plurality of devices that are coupled to a serial bus wherein each one of the plurality of devices uses only a single external connection (pin) for defining the multi-bit address to be configured for the respective ones of the plurality of devices. Any one or more of the single external connections (pins) may be reusable for other purposes after the multi-bit addresses for the plurality of devices have been configured.

BACKGROUND

Hardware addressing is traditionally used on I²C slave devices to allow more than one of the same type of device, e.g., opcode or slave address, coupled to the same I²C bus. This is accomplished by implementing hardware (HW) address pins that are independently biased to power or ground to create a unique slave address. For example, three (3) address pins allow up to eight (8) of the same type of devices to have unique slave addresses when coupled to the I²C bus.

However, the problem with the present technology HW addressing is that it uses multiple external connections (pins) on the integrated circuit packages of the devices when unique addressing is required for more than two devices. As integrated circuit package sizes are reduced so too are the number of external connections (pins) reduced, thus the ability to keep a HW addressing function for multiple devices is diminished or even eliminated.

SUMMARY

Therefore there is a need for a way to program a multi-bit unique address into a device by using a single external connection (pin) on the integrated circuit package of the device. This external connection (pin) used for programming of a unique address for the device preferably may be a reusable pin so that once the unique device address has been programmed the reusable external connection (pin) may be used for another operational and/or test function.

Unique addresses for a plurality of devices may be programmed through a single external connection (pin) by using ones of a plurality of different analog voltage or current values on the single external pin in combination with a serial clock of a serial data bus, for example but not limited to, an I²C bus serial clock for each device requiring a unique address. For example but not limited to, one of eight different analog voltage or current values may be converted to a digital representation thereof, e.g., unique three (3) bit addresses for each of the devices. The unique three-bit address is stored (latched) in the device after, for example but not limited to, detection by the device of eight (8) clocks on the serial clock line (SCL). Once the three-bit address has been stored (latched) in the device, the single external connection (pin) may be used for another purpose, e.g., multifunction pin. This three-bit address may be retained by the device until a power-on-reset (POR) or general reset condition occurs. Other addresses lengths having more or less than three bits and number of clocks may be used and are contemplated herein. Then once the POR or general reset condition has cleared the device again obtains its unique address as described hereinabove.

It is contemplated and within the scope of this disclosure that an address detection command may be broadcast to the devices, and upon receipt of this address detection broadcast command, the single external connection (pin) may be utilized as described above for configuring a unique device address. The address derived from the digital representation of the unique address voltage or current may be stored in the device upon detection of a certain number of clocks on the serial data bus as described hereinabove. Upon the detection of a clock edge in the case of a FLASH ADC implementation, and/or the address derived from the digital representation of the unique address may be stored in the device upon an address detection command broadcast to the devices coupled to the serial data bus.

Each one of the plurality of different analog voltage or current values may be generated with a unique external resistance value coupled between a voltage source and the single external connection (pin) of a respective device. The unique external resistance value may be one or more resistors configured to supply the one of the plurality of different analog voltage or current values associated with the desired device address. An analog-to-digital converter (ADC), e.g., a flash ADC, may be part of each of the devices and converts ranges of voltages into digital representations thereof that represent the desired device addresses. The unique external resistance value may be of a high enough value so as not to adversely affect operation of a primary function of the functionally multiplexed pin. Alternatively, the unique external resistance may be coupled between a power supply common and the single external connection (pin) of a respective device so long as a unique voltage or current value is created at the single external connection (pin) of a respective device in order to generate a unique address. It is also contemplated and within the scope of this disclosure that any analog voltage value from a voltage source may be used instead of from the aforementioned voltage divider.

Once the device address has been programmed, the address ADC and other associated circuits in the device may be shut down for lower power usage and/or pin reusability. Thus, dedicated pins for hardware addressing are no longer necessary, and the function of programming the device address may be multiplexed to a pin with a different primary function(s). For devices having an ADC as part of its functionality, the normal device ADC may be used to convert the ranges of voltages into digital representations thereof that represent the desired device address. Thus, only some logic and an analog switch need be added to an existing mixed signal, e.g., both analog and digital, device.

According to a specific example embodiment as described in the present disclosure, a device adapted for coupling to a serial data bus and having a single external multifunction connection used for programming an address into the device comprises: serial interface and control logic, the serial interface and control logic having an input coupled to an external serial data bus connection; an internal resistor having a first resistance value; an analog-to-digital converter (ADC); a primary function; a switch having a first signal port coupled to a single external connection, a second signal port coupled to the internal resistor, a third signal port coupled to an input of the ADC, a fourth signal port coupled to the primary function, and a control port coupled to the serial interface and control logic; an external resistor having a second resistance value, the external resistor coupled to the single external connection, wherein the combination of the first and second resistors creates a certain analog value that is applied to the input of the ADC during an address definition operation; an address register having data inputs coupled to respective digital outputs of the ADC and an address detection control input coupled to the serial interface and control logic, wherein logic levels on the respective digital outputs of the ADC are stored in the address register when the serial interface and control logic applies an address detection signal to the address store control input during an address detection operation; wherein the serial interface and control logic causes the switch to couple together the first and fourth signal ports during a normal operation, and the first, second and third signal ports during the address definition operation; whereby the ADC converts the certain analog value to a multi-bit digital address that is stored in the address register during the address detection operation; and thereafter the serial interface and control logic returns the switch during the a normal operation.

According to another specific example embodiment as described in the present disclosure, a device adapted for coupling to a serial data bus and having a single external multifunction connection used for programming an address into the device comprises: serial interface and control logic, the serial interface and control logic having an input coupled to an external serial data bus connection; an analog-to-digital converter (ADC); a primary function; a switch having a first signal port coupled to a single external connection, a second signal port coupled to an input of the ADC, a third signal port coupled to the primary function, and a control port coupled to the serial interface and control logic; first and second resistors having first and second resistance values, respectively, the first and second resistors coupled to the single external connection, wherein the combination of the first and second resistors creates a certain analog value that is applied to the input of the ADC during an address definition operation; an address register having data inputs coupled to respective digital outputs of the ADC and an address detection control input coupled to the serial interface and control logic, wherein logic levels on the respective digital outputs of the ADC are stored in the address register when the serial interface and control logic applies an address detection signal to the address detection control input during an address detection operation; wherein the serial interface and control logic causes the switch to couple together the first and third signal ports during a normal operation, and the first and second signal ports during the address definition operation; whereby the ADC converts the certain analog value to a multi-bit digital address that is stored in the address register during the address detection operation; and thereafter the serial interface and control logic returns the switch to normal operation.

According to yet another specific example embodiment as described in the present disclosure, a method for programming a multi-bit digital address into a device by using a single external multifunction connection and a serial data bus comprises the steps of: providing an external serial data bus connection; providing serial interface and control logic, the serial interface and control logic having an input coupled to the external serial data bus connection; providing a switch having a control input coupled to the serial interface and control logic; providing a single external connection coupled to the switch; providing an analog-to-digital converter (ADC) coupled to the switch; providing an address register coupled to the ADC and the serial interface and control logic; providing a primary function coupled to the switch; providing first and second resistors coupled to the single external connection; coupling together the single external connection and the ADC with the switch during an address definition operation; creating a certain analog value with the first and second resistors; converting the certain analog value to a multi-bit digital address with the ADC; storing the multi-bit digital address in the address register during an address detection operation; and coupling the single external connection to the primary function during a normal operation.

According to still another specific example embodiment as described in the present disclosure, a method for programming a multi-bit digital address into a device by using a single external multifunction connection and a serial data bus comprises the steps of: providing an external serial data bus connection; providing serial interface and control logic, the serial interface and control logic having an input coupled to the external serial data bus connection; providing a switch having a control input coupled to the serial interface and control logic; providing a single external connection coupled to the switch; providing an analog-to-digital converter (ADC) coupled to the switch; providing an address register coupled to the ADC and the serial interface and control logic; providing a primary function coupled to the switch; providing first and second external resistors coupled to the single external connection; coupling together the single external connection and the ADC with the switch during an address definition operation; creating a certain analog value with the first and second external resistors; converting the certain analog value to a multi-bit digital address with the ADC; storing the multi-bit digital address in the address register during an address detection operation; and coupling the single external connection to the primary function during a normal operation.

According to another specific example embodiment as described in the present disclosure, a device adapted for coupling to a serial data bus and having a single external multifunction connection used for programming an address into the device comprises: serial interface and control logic, the serial interface and control logic having an input coupled to an external serial data bus connection; an analog-to-digital converter (ADC); a primary function; a switch having a first signal port coupled to a single external connection, a second signal port coupled to an input of the ADC, a third signal port coupled to the primary function, and a control port coupled to the serial interface and control logic; the single external connection coupled to a certain analog value that is applied to the input of the ADC during an address definition operation; an address register having data inputs coupled to respective digital outputs of the ADC and an address detection control input coupled to the serial interface and control logic, wherein logic levels on the respective digital outputs of the ADC are stored in the address register when the serial interface and control logic applies an address detection signal to the address detection control input during an address detection operation; wherein the serial interface and control logic causes the switch to couple together the first and third signal ports during a normal operation, and the first and second signal ports during the address definition operation; whereby the ADC converts the certain analog value to a multi-bit digital address that is stored in the address register during the address detection operation; and thereafter the serial interface and control logic returns the switch to normal operation.

BRIEF DESCRIPTION OF THE DRAWINGS

A more complete understanding of the present disclosure thereof may be acquired by referring to the following description taken in conjunction with the accompanying drawing, wherein.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

Referring now to the drawing, the details of specific example embodiments are schematically illustrated. Like elements in the drawings will be represented by like numbers, and similar elements will be represented by like numbers with a different lower case letter suffix.

Figure 1:
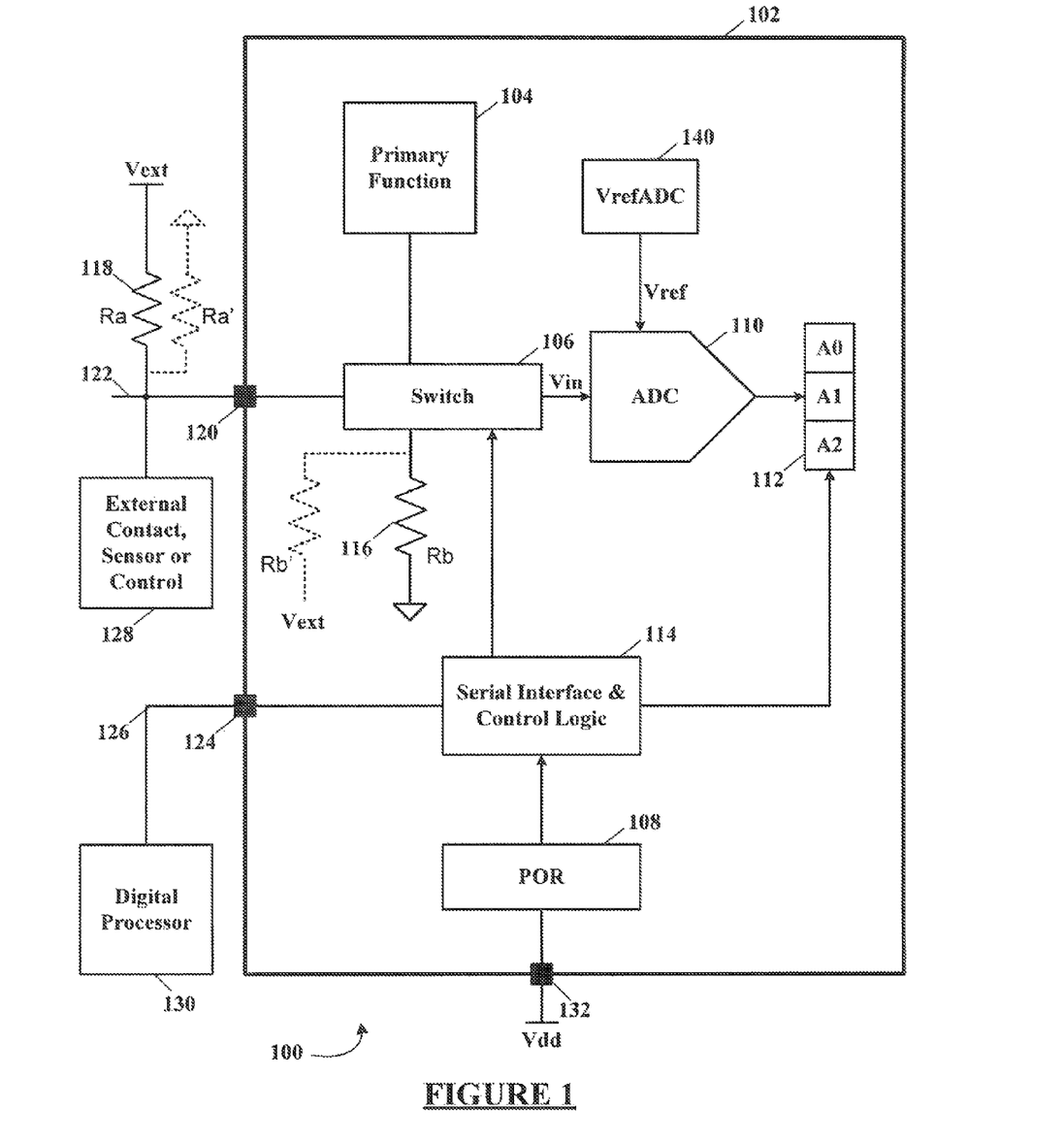
FIG. 1 illustrates a schematic block diagram of an integrated circuit device having a single external connection for configuring a multi-bit address in combination with a serial data bus, according to a specific example embodiment of this disclosure.

Referring to FIG. 1, depicted is a schematic block diagram of an integrated circuit device having a single external connection for configuring a multi-bit address in combination with a serial data bus, according to a specific example embodiment of this disclosure. An integrated circuit device, generally represented by the numeral 100, may comprise an analog switch 106, an analog-to-digital converter (ADC) 110, an address register 112, serial interface and control logic 114, an internal resistor 116 and a primary function 104. In addition, a power-on-reset (POR) 108 and/or brownout detector (not shown) may be incorporated with the aforementioned elements and may be fabricated on an integrated circuit die 102 and coupled to an external voltage terminal 132.

An external resistor 118 is used in combination with the internal resistor 116 for defining a certain voltage that is converted into a desired device address and stored in the address register 112 as more fully discussed hereinafter. During device 100 start-up, power-on-reset and/or a serial bus command, the serial interface and control logic 114 will cause the switch 106 to couple a single external connection 120 to the internal resistor 116 and an input of the ADC 110. The switch 106 may also decouple the primary function 104 from the single external connection 120.

The external resistor 118, Ra, is coupled between the single external connection 120 and a voltage source, Vext, which can be for example equal to the power supply Vdd or a voltage reference Vref. When the switch 106 couples the single external connection 120 to the internal resistor 116, Rb, a simple voltage divider circuit is formed that applies an analog voltage value to the input of the ADC 110. This analog voltage value may be determined using Ohm's Law according to the formula:

$$Vin=Vext*Rb/(Ra+Rb).$$

Where Vin is the voltage at the input of the ADC 110. See FIG. 4 for various voltage values of Vin at different voltage values of Vext. In the alternative, it is contemplated and within the scope of this disclosure that the internal resistor 116, Rb, may be coupled to the voltage source Vext and the external resistor 118, Ra, may be coupled between the power supply common and the single external connection 120 so as to produce a unique analog voltage value at the input of the ADC 110. An ADC voltage reference input (Vref) is coupled to a voltage source reference 140, VRefADC. The ratio of Vin/Vref at the input of the ADC 110 determines the output code of the ADC 110 and equals:

$$Vext/VRefADC*Rb/(Ra+Rb).$$

The address is determined by Ra if Rb is fixed in the device 102. Also using a known and stable voltage source reference 140, VRefADC, that is substantially equal to Vext (for example if they are both equal to Vdd or a voltage source Vref), allows removal (ignoring) of all voltages from the above equation so that the address is only determined by the value of Ra, if the internal Rb has a fixed known resistance value. Any combination and connections of Ra and Rb may be used for creating Vin, and are contemplated herein for all purposes.

Vin is converted by the ADC 110 into a digital representation and then encoded as, for example but is not limited to, a three-bit binary address. The encoded three-bit binary address may then be latched (stored) in the address register 112, e.g., as A2, A1, A0. An output from the serial interface and control logic 114 may be used to control latching in the address register 112. Thus a single external resistor 118 may be connected to a single external connection 120 and used to program a unique address for the device 100 coupled thereto. Different resistance values of the single external resistor 118 may be used to define different analog voltages representative of desired device addresses (see the tables in FIG. 4). Other addresses lengths having more or less than three bits and number of clocks may be used and are contemplated herein.

The serial interface and control logic 114 may operate as follows: (A) Upon a power-on-reset (POR) event and/or brown-out event, the POR 108 may cause the serial interface and control logic 114 to cause the switch 106 to connect the external resistor 118 (connected to the external connection 120) to the internal resistor 116 and the input of the ADC 110, wherein the ADC 110 converts the resulting analog voltage at its input into a digital representation thereof and encodes the digital representation into a three-bit binary address. When the serial interface and control logic 114 receives a certain number of clocks, e.g., eight clocks, at the serial data bus clock external connection 124, the serial interface and control logic 114 causes the address register 112 to latch (store) the three-bit binary address.

The address derived from the digital representation of the unique address voltage or current may be stored in the device upon detection of a certain number of clocks on the serial data bus as described hereinabove. Upon the detection of a clock edge in the case of a FLASH ADC implementation, and/or the address derived from the digital representation of the unique address may be stored in the device upon an address detection command broadcast to the devices coupled to the serial data bus.

Once the new three-bit binary address is latched into the address register 112, the serial interface and control logic 114 may cause the switch 106 to go back to a normal use configuration, e.g., the primary function 104 being coupled to the single external connection 120. An external contact, sensor or control 128 may be coupled to the single external connection 120 and may thereby be coupled to the primary function 104. Since the external resistor 118 may be a high value resistance, it may have minimal effect upon the operation of the external contact, sensor or control 128. The switch 106, in the normal use configuration, may disconnect the internal resistor 116 and the input of the ADC 110 from the single external connection 120 for further reduction of power used. It is also contemplated and within the scope of this disclosure that the ADC 110 may be used as a standard ADC in normal operation of the device 100 and may have its input coupled to analog signal and its output coupled to another internal logic register (not shown). The switch 106 may also discount the resistor 118 (Ra) so that substantially no current flows therethrough for a further savings in power usage.

Also contemplated herein, the serial interface and control logic 114 may operate as follows: (B) Upon receipt of a "detection address" broadcast command on the serial bus 126 that is coupled to the serial data bus clock external connection 124, the serial interface and control logic 114 may cause the switch 106 to couple the internal resistor 116 and input of the ADC 110 to the single external connection 120 as described hereinabove. The resulting analog voltage is then converted/encoded into a three-bit binary address as described hereinabove. Either upon receipt of the certain number of clocks, as described hereinabove, and/or a "latch address" broadcast command on the serial bus 126, the three-bit binary address is latched into the address register 112. Thereafter the switch 106 may switch back to the normal configuration as described hereinabove.

A digital processor 130 may be coupled to the serial data bus 126. The serial data bus 126 may be any type of serial data bus as known to one having ordinary skill in digital circuits, for example but not limited to, Inter-Integrated Circuit (I²C) bus, Serial Peripheral Interface (SPI) Bus, single connection input-output (SCIO) bus, etc. The device 100 may be any type of peripheral device that is normally addressed on a serial data bus. The digital processor 130 may be, for example but not limited to, a microprocessor, microcontroller, a digital signal processor, an application specific integrated circuit (ASIC), a programmable logic array (PLA), etc.

Figure 2:
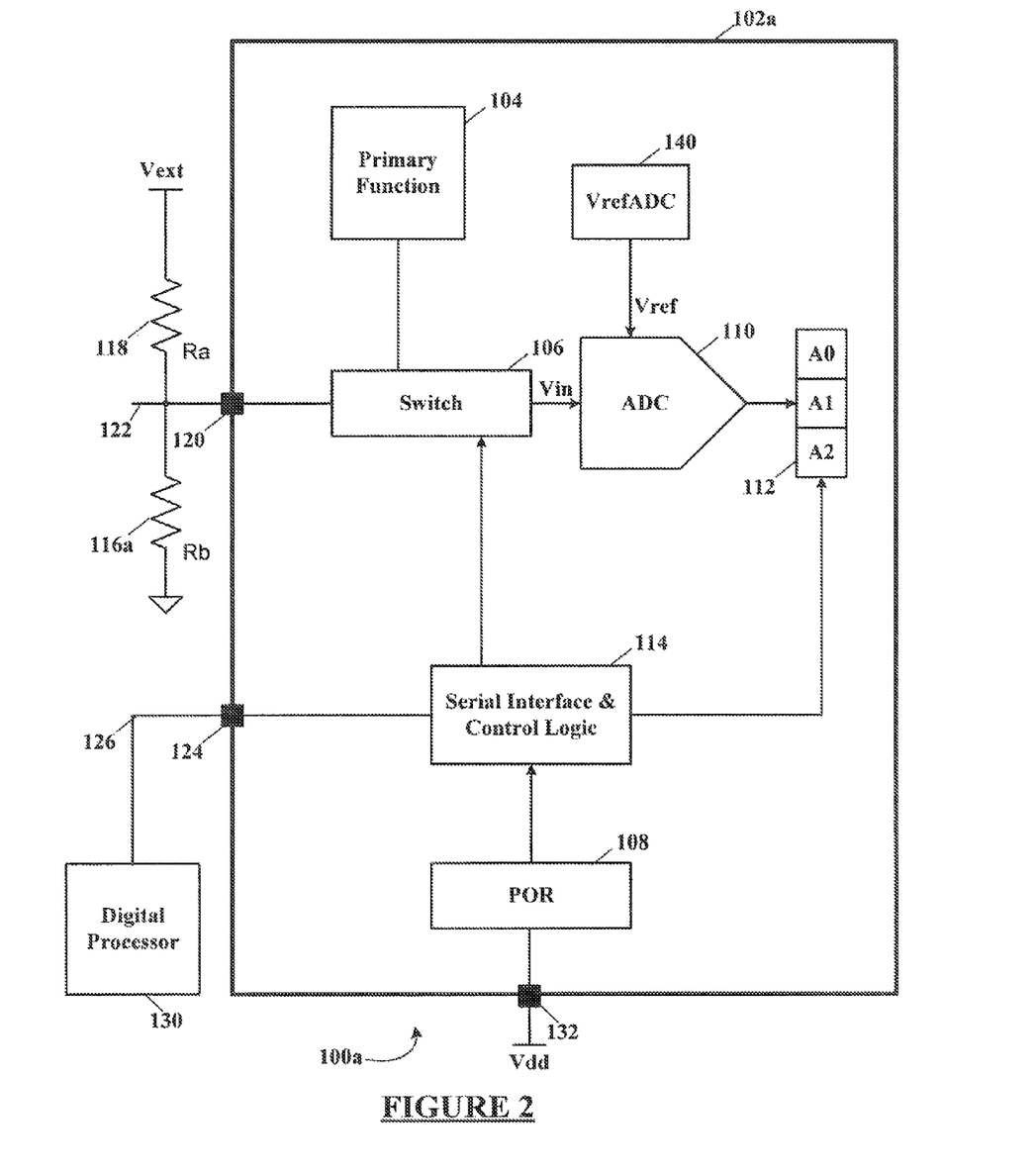
FIG. 2 illustrates a schematic block diagram of an integrated circuit device having a single external connection for configuring a multi-bit address in combination with a serial data bus, according to another specific example embodiment of this disclosure.

Referring to FIG. 2, depicted is a schematic block diagram of an integrated circuit device having a single external connection for configuring a multi-bit address in combination with a serial data bus, according to another specific example embodiment of this disclosure. An integrated circuit device, generally represented by the numeral 100a, may use an external resistor 116a, Rb, instead of the internal resistor 116 shown in FIG. 1. Otherwise, operation and functions of the device 100a are substantially similar to the operation and functions of the device 100 shown in FIG. 1 and as describe hereinabove.

Figure 3:
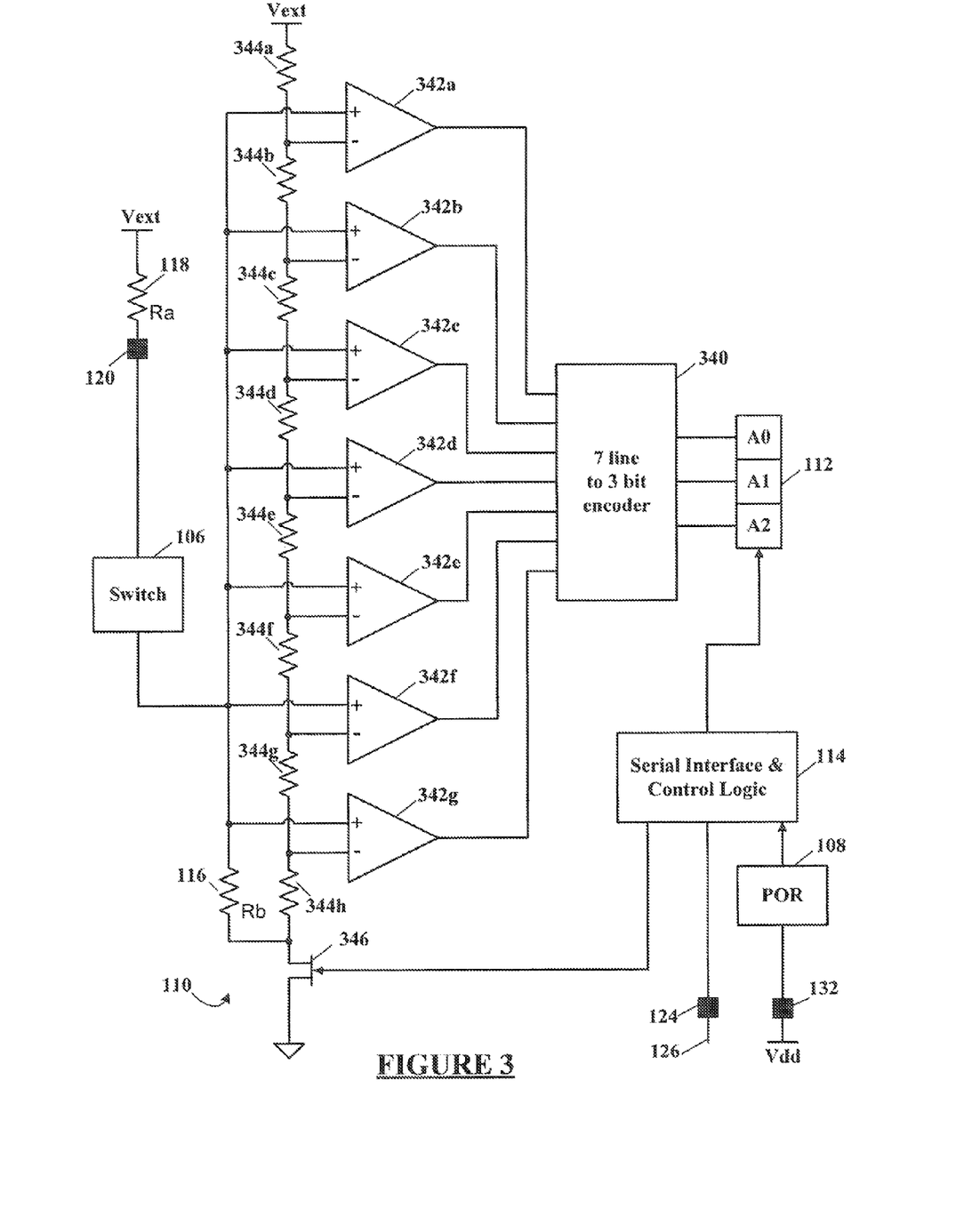
FIG. 3 illustrates a schematic diagram of a flash analog-to-digital converter (ADC) that may be used with the devices shown in FIGS. 1 and 2.

Referring to FIG. 3, depicted is a schematic diagram of a flash analog-to-digital converter (ADC) that may be used with the devices shown in FIGS. 1 and 2. The ADC 110 may comprise a plurality of voltage comparators 342, a resistance ladder network comprising a plurality of resistors 344, and a 7 line to 3 bit encoder 340. A switch 346 (e.g., field effect transistor) may be used to disconnect the plurality of resistors 344 and the internal resistor 116 so as to reduce power consumption of the device 100 when not in the address configuration mode. Typically with a FLASH ADC implementation, upon the detection of a clock edge, the address derived from the digital representation of the unique address may be stored in the device upon an address detection command broadcast to the devices coupled to the serial data bus.

Figure 4:
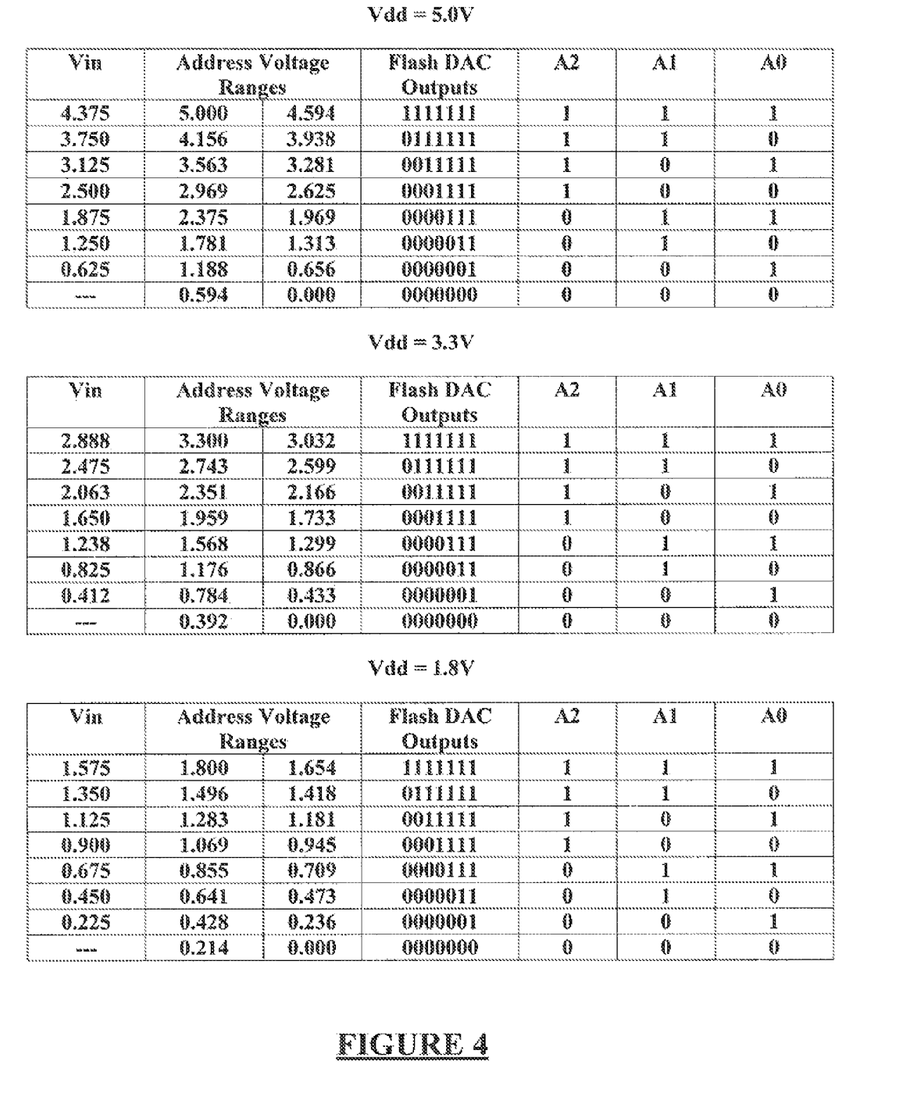
FIG. 4 illustrates tables of reference voltages and address voltage ranges for different power supply voltages, and respective flash ADC outputs and three-bit binary addresses according to the teachings of this disclosure.

Referring to FIG. 4, depicted are tables of reference voltages and address voltage ranges for different power supply voltages, and respective flash ADC outputs and three-bit binary addresses according to the teachings of this disclosure. Three tables are shown, one for Vdd=5.0 volts, another for Vdd=3.3 volts, and still another for Vdd=1.8 volts. The reference voltages at the respective negative (−) inputs of the plurality of voltage comparators 342a-342g are shown in the column entitled "Vin" The respective outputs of the plurality of voltage comparators 342a-342g are depicted in the column entitled "Flash ADC outputs" and correspond to the voltage ranges indicated in the column entitled "Address Voltage Ranges." The outputs of the plurality of voltage comparators 342a-342g are arranged to produce a "thermometer" type of coding that is applied to the 7 line to 3 bit encoder 340 (FIG. 3) that converts the thermometer coding from the plurality of voltage comparators 342 into the three-bit binary address, e.g., A2, A1, A0. So long as a voltage to the input of the ADC 110 is substantially within any one of the Address Voltage Ranges shown in FIG. 4, a respective three-bit binary address will be property encoded upon completion of the certain number of clock pulses or the serial data bus "latch address" command, typically one clock pulse after the certain number of clocks.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A device adapted for coupling to a serial data bus and having a single external multifunction connection used for programming an address into the device, said device comprises:

serial interface and control logic, the serial interface and control logic having an input coupled to an external serial data bus connection;

an analog-to-digital converter (ADC);

a primary function;

a switch having a first signal port coupled to a single external connection, a second signal port coupled to an input of the ADC, a third signal port coupled to the primary function, and a control port coupled to the serial interface and control logic;

first and second resistors having first and second resistance values, respectively, the first and second resistors coupled to the single external connection, wherein the combination of the first and second resistors creates a certain analog value that is applied to the input of the ADC during an address definition operation;

an address register having data inputs coupled to respective digital outputs of the ADC and an address detection control input coupled to the serial interface and control logic, wherein logic levels on the respective digital outputs of the ADC are stored in the address register when the serial interface and control logic applies an address detection signal to the address detection control input during an address detection operation;

wherein the serial interface and control logic causes the switch to couple together the first and third signal ports during a normal operation, and the first and second signal ports during the address definition operation;

whereby the ADC converts the certain analog value to a multi-bit digital address that is stored in the address register during the address detection operation; and thereafter the serial interface and control logic returns the switch to normal operation.

2. The device according to claim 1, further comprising a power-on-reset (POR) circuit coupled to the serial interface and control logic, wherein:

when a POR event is detected by the POR circuit,
the serial interface and control logic enters into the address definition operation, and
when a certain number of clocks are detected on the external serial data bus connection by the serial interface and control logic, the serial interface and control logic enters into the address detection operation and thereafter returns to the normal operation.

3. The device according to claim 2, wherein the certain number of clocks comprises eight clocks.

4. The device according to claim 1, wherein:
when an address detection command is detected on the external serial data bus by the serial interface and control logic,
the serial interface and control logic enters into the address definition operation, and
when a certain number of clocks are detected on the external serial data bus connection by the serial interface and control logic, the serial interface and control logic enters into the address detection operation and thereafter returns to the normal operation.

5. The device according to claim 4, wherein the certain number of clocks comprises eight clocks.

6. The device according to claim 1, wherein:
when an address detection command is detected on the external serial data bus by the serial interface and control logic,
the serial interface and control logic enters into the address definition operation, and
when a latch address command is detected on the external serial data bus connection by the serial interface and control logic, the serial interface and control logic enters into the address detection operation and thereafter returns to the normal operation.

7. The device according to claim 1, wherein the ADC is a flash ADC.

8. The device according to claim 1, wherein the first resistor is coupled a power supply common and the second resistor is coupled to a power supply voltage.

9. The device according to claim 1, wherein the external serial data bus connection is coupled to a digital processor.

10. The device according to claim 9, wherein the digital processor is selected from the group consisting of a microprocessor, microcontroller, a digital signal processor, an application specific integrated circuit (ASIC), and a programmable logic array (PLA).

11. The device according to claim 1, wherein the external serial data bus connection is coupled to a serial data bus selected from the group consisting of Inter-Integrated Circuit ($I^2C$) bus, Serial Peripheral Interface (SPI) Bus, Universal Serial Bus (USB), and single connection input-output (SCIO) bus.

12. The device according to claim 1, further comprising a circuit for reducing power usage by the ADC and internal resistor when in the normal operation.

13. The device according to claim 1, wherein the serial interface and control logic, the internal resistor, the ADC, the primary function, the switch, and the address register are fabricated on an integrated circuit die.

14. The device according to claim 13, wherein integrated circuit die is enclosed in a low pin count integrated circuit package.

15. A device adapted for coupling to a serial data bus and having a single external multifunction connection used for programming an address into the device, said device comprises:

serial interface and control logic, the serial interface and control logic having an input coupled to an external serial data bus connection;
an analog-to-digital converter (ADC);
a primary function;
a switch having a first signal port coupled to a single external connection, a second signal port coupled to an input of the ADC, a third signal port coupled to the primary function, and a control port coupled to the serial interface and control logic;
the single external connection coupled to a certain analog value that is applied to the input of the ADC during an address definition operation;
an address register having data inputs coupled to respective digital outputs of the ADC and an address detection control input coupled to the serial interface and control logic, wherein logic levels on the respective digital outputs of the ADC are stored in the address register when the serial interface and control logic applies an address detection signal to the address detection control input during an address detection operation;
wherein the serial interface and control logic causes the switch to couple together the first and third signal ports during a normal operation, and the first and second signal ports during the address definition operation;
whereby the ADC converts the certain analog value to a multi-bit digital address that is stored in the address register during the address detection operation; and
thereafter the serial interface and control logic returns the switch to normal operation.

16. The device according to claim 15, wherein the certain analog value is a voltage value.

17. The device according to claim 15, wherein the certain analog value is a current value.

* * * * *